US 6,631,956 B2

(12) United States Patent
Mauro et al.

(10) Patent No.: US 6,631,956 B2
(45) Date of Patent: Oct. 14, 2003

(54) HEADREST SUPPORT ROD WITH PLASTIC SLEEVES

(75) Inventors: André Ribeiro Mauro, Dearborn, MI (US); Sergio Mitsuo Hatano, Vila Nova York (BR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/915,770

(22) Filed: Jul. 26, 2001

(65) Prior Publication Data
US 2003/0020314 A1 Jan. 30, 2003

(51) Int. Cl.[7] ............................................. A47C 1/10
(52) U.S. Cl. ................... 297/410; 297/391; 297/DIG. 2
(58) Field of Search ........................... 297/391, 452.18, 297/DIG. 2, 410

(56) References Cited

U.S. PATENT DOCUMENTS

| 4,695,095 A | * | 9/1987 | Faust et al. | 297/410 |
| 4,854,642 A | * | 8/1989 | Vidawns et al. | 297/410 |
| 4,976,493 A | * | 12/1990 | Frankila | 297/410 |
| 5,080,437 A | * | 1/1992 | Pesta et al. | 297/410 |
| 5,788,250 A | * | 8/1998 | Masters et al. | 297/410 |
| 5,816,658 A | * | 10/1998 | Wallis | 297/410 |
| 5,895,094 A | * | 4/1999 | Mori et al. | 297/410 |

FOREIGN PATENT DOCUMENTS

| FR | 2 612 305 | 9/1988 |
| JP | 57-89944 | 6/1982 |
| JP | 60-82317 | 5/1985 |
| JP | 10-163014 | 6/1989 |
| JP | 50-123801 | 5/1993 |
| WO | WO 98/11375 | 3/1998 |

* cited by examiner

Primary Examiner—Peter M. Cuomo
Assistant Examiner—Stephanie N. Harris
(74) Attorney, Agent, or Firm—Bill C. Panagos

(57) ABSTRACT

A method of manufacturing a headrest support rod includes bending a cylindrical steel rod into a desired shape including first and second legs. The bent steel rod is then placed into an injection mold, and first and second plastic sleeves are injection molded over the first and second legs, respectively, to complete the headrest support rod. Accordingly, weight of the headrest support rod is minimized. Preferably, the first and second plastic sleeves include lock slots formed therein.

9 Claims, 2 Drawing Sheets

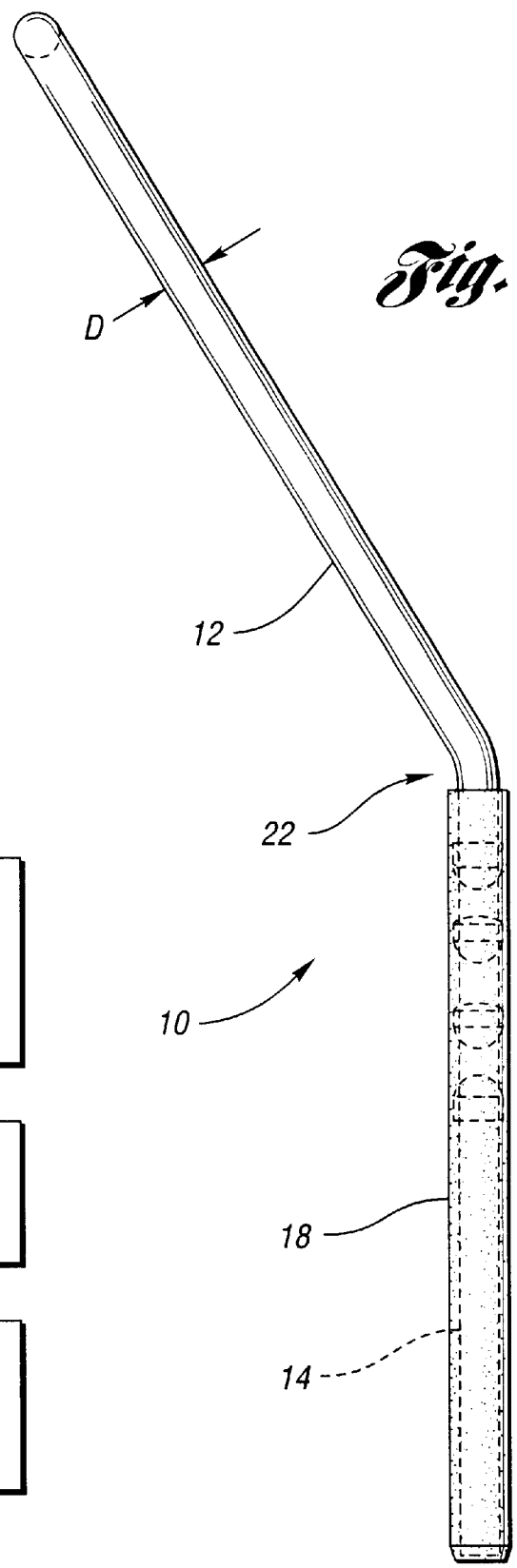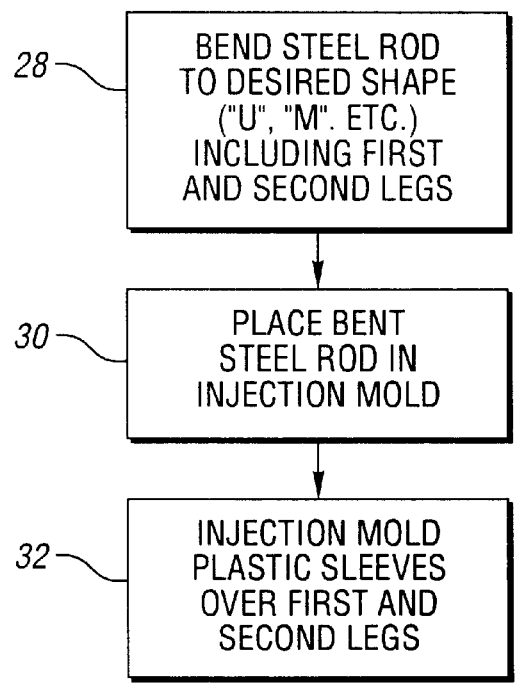
Fig. 2
Fig. 3

HEADREST SUPPORT ROD WITH PLASTIC SLEEVES

BACKGROUND OF THE INVENTION

1. Field of the Invention

The present invention relates to a headrest support rod including a bent steel rod which is overmolded with plastic sleeves to minimize weight and reduce manufacturing costs.

2. Background Art

In a vehicle seat assembly, a headrest is typically supported on top of a seat back by a steel headrest support rod. The steel rod is typically a 1018 steel which is bent to a desired shape and then broached to form adjustment slots along the sides of the rod. The ends of the rod are turned to eliminate any sharp edges, and the rod is then chrome-plated to provide an attractive appearance.

The above-described broaching, chrome-plating and turning processes add significant expense to the manufacture of the headrest support rod. Accordingly, it is desirable to reduce costs associated with manufacturing of the headrest support rod.

SUMMARY OF THE INVENTION

The present invention provides an improved headrest support rod and method of manufacturing the same in which a cylindrical steel rod of reduced diameter is bent to a desired shape and plastic sleeves are injection molded over first and second legs of the bent rod. By using plastic sleeves, the broaching, turning and chrome-plating processes are eliminated while reducing weight of the headrest support rod.

More specifically, the present invention provides a method of manufacturing a headrest support rod including the steps of: a) bending a cylindrical steel rod into a desired shape including first and second legs; b) placing the bent steel rod into an injection mold; and c) injection molding first and second plastic sleeves over the first and second legs, respectively, to complete the headrest support rod, thereby minimizing weight of the headrest support rod.

Preferably, the first and second plastic sleeves include lock slots molded therein to facilitate locking or position adjustment of the headrest support rod with respect to a guide bushing on the seat back.

Also, preferably, the steel rod is between approximately 6 mm and 10 mm in diameter, and most preferably approximately 8 mm in diameter. The plastic sleeves are preferably substantially cylindrical and hollow in shape with 2 mm thick walls so that the completed headrest support rod is approximately 12 mm thick in diameter along the first and second legs when the steel rod is 8 mm in diameter.

Preferably, the cylindrical steel rod is an SAE 1045 steel, and the plastic sleeves are a nylon material which shrinks after injection molding onto the rod to facilitate a secure attachment of the plastic sleeves to the steel rod.

Another aspect of the invention provides a headrest support rod apparatus including a bent steel rod having first and second legs with first and second plastic sleeves injection molded over the first and second legs, respectively, to complete the headrest support rod, thereby minimizing weight of the headrest support rod. Preferably, the first and second plastic sleeves include lock slots formed therein.

Accordingly, an object of the invention is to provide an improved headrest support rod and an improved method of manufacturing a headrest support rod in which manufacturing costs are reduced.

Another object of the invention is to provide an improved headrest support rod in which broaching, turning and chrome-plating processes are not necessary.

A further object of the invention is to provide a headrest support rod in which a steel rod is bent into a desired shape including first and second legs, and plastic sleeves are injection molded over the first and second legs to complete the headrest support rod.

A still further object of the invention is to provide a headrest support rod including a bent steel rod with plastic sleeves molded thereon wherein lock slots are formed in the plastic sleeves in the injection molding process to eliminate the broaching process from the manufacture of the headrest support rod.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 shows a side view of the headrest support rod of FIG. 1; and

FIG. 3 is a flow chart illustrating method steps of the present invention.

DETAILED DESCRIPTION OF THE PREFERRED EMBODIMENT

Figure 1:
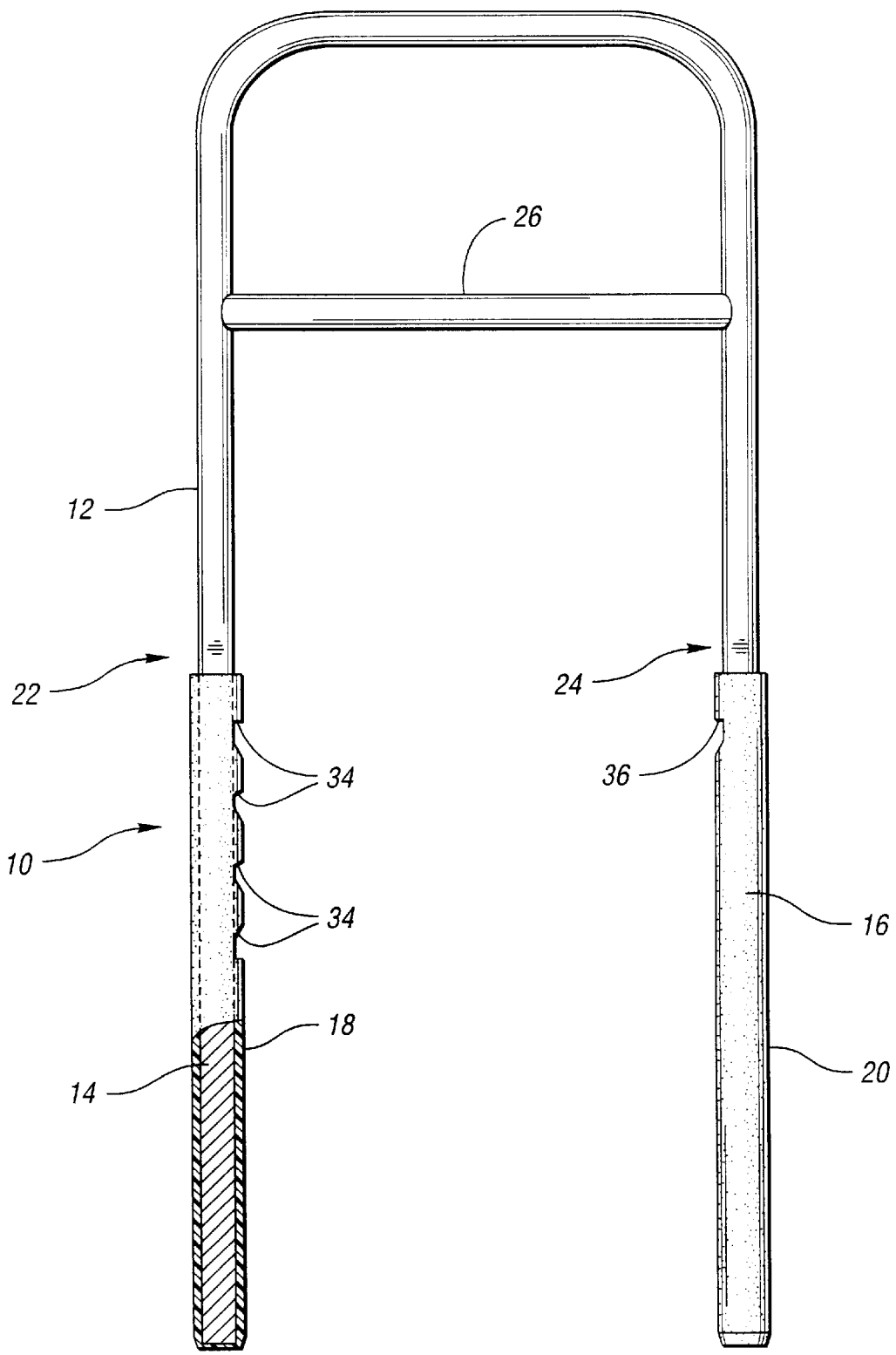
FIG. 1 shows a plan view of a completed headrest support rod in accordance with the present invention.

The present invention will be described with reference to FIGS. 1–3.

As shown in FIGS. 1 and 2, the completed headrest support rod 10 includes a cylindrical bent steel rod 12 having first and second legs 14,16 which are covered by first and second plastic sleeves 18,20, respectively.

The steel rod 12 has a continuous diameter D of between 6 and 10 mm, and most preferably 8 mm. The steel rod 12 is preferably an SAE 1045 steel, but other steels, such as SAE 1010, 1015 or 1030, would work for the intended purpose. The steel rod 12 is bent into a substantially U shape, as viewed in FIG. 1, including first and second legs 14,16 which extend downward from the curved portions 22,24, respectively. The bent steel rod 12 may include a cross-bar 26 connected between opposing sides of the bent rod.

As illustrated in FIG. 3, once the steel rod 12 has been bent to a desired shape, such as a "U" or "M" shape, as illustrated in step 28, the bent steel rod is placed into an injection mold, as illustrated in step 30. In step 32, the plastic sleeves 18,20 are injection molded over the first and second legs 14,16, respectively. The plastic sleeves 18,20 are preferably a nylon material, but could be polyacetyl, polypropylene, or other thermoplastic material. After injection into the mold, the plastic sleeves cool and shrink to form a tight fit on the first and second legs 14,16 of the steel rod 12.

As shown in FIG. 1, the plastic sleeves 18,20 include lock slots 34,36 formed therein to facilitate vertical adjustment of the completed headrest support rod 10 and vertical locking of the headrest support rod 10 along a guide bushing on the top of a corresponding seat back.

Once the headrest support rod 10 has been completed, the headrest support rod 10 goes into a foam-mold, and foam is injected onto the rod to form the headrest portion, which is then trimmed with a cover material. Alternatively, a foam-in-place process could be used wherein a trim cover is put in a mold with the headrest rod protruding therefrom, and foam is injected into the cover and expands to fill the cover.

The plastic sleeves 18,20 are substantially cylindrical and hollow in shape with 2 mm thick walls so that the completed headrest support rod is approximately 12 mm thick in diameter along the first and second legs.

By using the plastic sleeves 18,20 of the present invention to form an overall diameter of 12 mm for the headrest support rod 10, the weight of the support rod is reduced considerably, and manufacturing costs are reduced by eliminating the broaching, turning, and chrome-plating processes described previously with respect to the prior art methods.

The legs 14,16 of the completed headrest support rod 10 are inserted into a plastic guide bushing on top of a vehicle seat back and may be adjusted with respect to the plastic bushing via the slots 34.

In one embodiment, the present invention saves about 0.2 pounds per headrest, which is about 0.8 pounds per vehicle with four headrests.

While the best mode for carrying out the invention has been described in detail, those familiar with the art to which this invention relates will recognize various alternative designs and embodiments for practicing the invention within the scope of the appended claims.

What is claimed is:

1. A headrest support rod comprising:
   a bent cylindrical steel rod having first and second legs; and
   first and second plastic sleeves molded over the first and second legs, respectively, such that the first and second sleeves form a tight fit on and are fixed to the first and second legs, respectively, wherein one of the plastic sleeves includes multiple lock slots formed therein to facilitate vertical adjustment of the legs and the plastic sleeves.

2. The headrest support rod of claim 1, wherein said first and second plastic sleeves include lock slots formed therein.

3. The headrest support rod of claim 2, wherein said cylindrical steel rod is approximately 8 mm in diameter, and said plastic sleeves are substantially cylindrical and hollow in shape with 2 mm thick walls so that the completed headrest support rod is approximately 12 mm thick in diameter along the first and second legs.

4. The headrest support rod of claim 1, wherein said cylindrical steel rod has a continuous diameter throughout its length.

5. The headrest support rod of claim 4, wherein said diameter is between approximately 6 mm and 10 mm.

6. The headrest support rod of claim 5, wherein said diameter is approximately 8 mm.

7. The headrest support rod of claim 1, wherein said cylindrical steel rod comprises SAE 1045 steel.

8. The headrest support rod of claim 1, wherein said plastic sleeves comprise a nylon material.

9. The headrest support rod of claim 1, wherein the headrest support rod is configured for use with a seat back, and the legs and the plastic sleeves are adjustable with respect to the seat back.

* * * * *